May 2, 1933. W. J. WILLIAMS 1,907,168
MECHANISM FOR RECORDING THE DEVIATION FROM THE PERPENDICULAR OF A DRILL HOLE
Filed Sept. 22, 1930 3 Sheets-Sheet 1

May 2, 1933. W. J. WILLIAMS 1,907,168
MECHANISM FOR RECORDING THE DEVIATION FROM THE PERPENDICULAR OF A DRILL HOLE
Filed Sept. 22, 1930 3 Sheets-Sheet 2

INVENTOR.
William J. Williams
BY
ATTORNEY.

May 2, 1933. W. J. WILLIAMS 1,907,168
MECHANISM FOR RECORDING THE DEVIATION FROM THE PERPENDICULAR OF A DRILL HOLE
Filed Sept. 22, 1930 3 Sheets-Sheet 3
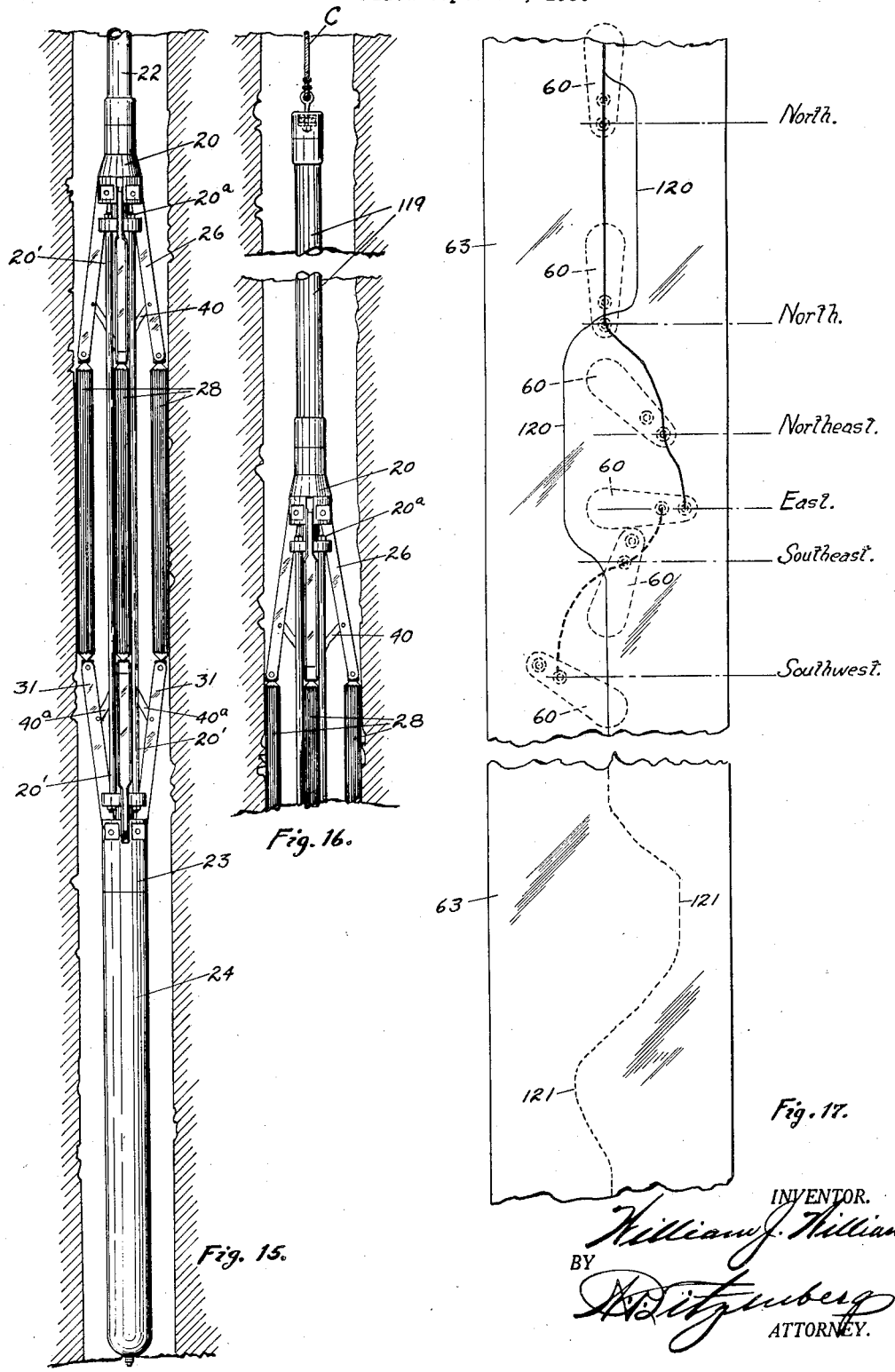

Patented May 2, 1933

1,907,168

UNITED STATES PATENT OFFICE

WILLIAM J. WILLIAMS, OF SOUTH GATE, CALIFORNIA, ASSIGNOR OF ONE-HALF TO L. A. WAGNER, OF LOS ANGELES, CALIFORNIA

MECHANISM FOR RECORDING THE DEVIATION FROM THE PERPENDICULAR OF A DRILL HOLE

Application filed September 22, 1930. Serial No. 483,600.

My invention relates to mechanism for recording the deviation from the perpendicular of a drill hole, such as deep oil wells and the like, and the direction and extent of such deviation. It is further improvement in my invention as set forth in my pending application, Serial No. 364,354, and my application Serial No. 408,507.

My invention as herein set forth and described embodies a mechanism which is more positive and accurate in its operation of the recording mechanism, is more certain to be actuated by contact with the wall of the hole as it is let down into said hole, whereby any rotation or twist from a given or starting position is recorded, and any deviation or incline from the perpendicular is also recorded and indicated, and the rotation and deviation from the perpendicular are so related and correlated that the record of any rotation from the starting position, taken with the record of the departure from the perpendicular, will indicate the direction and the extent of the deviation of the hole from the perpendicular.

In order to further explain my invention, I have illustrated the same on the accompanying three sheets of drawings, which I will now describe.

Figure 1 is a side elevation of that part of the instrument which engages and is operated by contact with the wall of the hole and which operates the recording mechanism indicating the direction and amount of any rotation thereof;

Figure 2 is a vertical or longitudinal sectional view through the mechanism shown in Fig. 1;

Figure 3 is a cross sectional view taken at the position of line 3—3 on Figs. 1 and 2;

Figure 4 is a cross sectional view taken at the position of line 4—4 on Figs. 1 and 2;

Figure 5 is a cross sectional view taken at the position of line 5—5 on Figs. 1 and 2;

Figure 6 is a cross sectional view taken at the position of line 6—6 on Figs. 1 and 2;

Figure 7 is a cross sectional view taken at the position of line 7—7 on Figs. 1 and 2;

Figure 8 is a fragmentary, vertical sectional view taken at the position of line 8—8 on Fig. 1;

Figure 15 is a view showing the entire instrument in a well;

Figure 16 is a view showing how the instrument can be connected to a cable rather than to a drill pipe; and Figure 17 is a view of the record tape, showing diagrammatically the record made thereon, with the instrument in different positions.

Figures 9, 10, 11, 12, 13, 14:
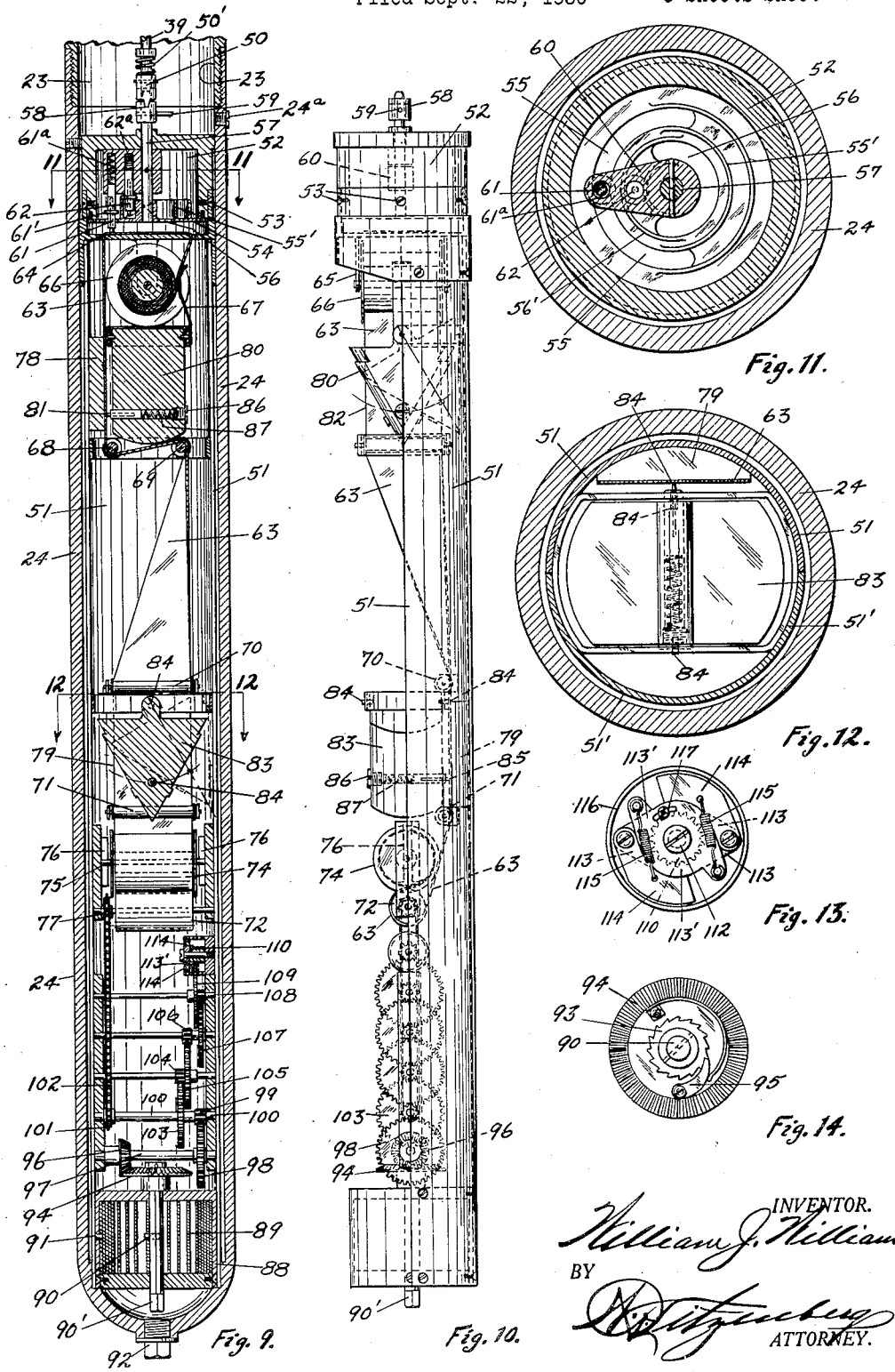
Figure 9 is a vertical sectional view through the recording mechanism which is coupled to and actuated by the mechanism shown in Figs. 1 and 2, and shown in a case.
Figure 10 is a side elevation of the recording mechanism, removed from the case, with its cover also removed, and as seen from the right hand side of Fig. 9.
Figure 11 is a cross sectional view through the instrument at the position of line 11—11, on Fig. 9.
Figure 12 is a cross sectional view taken at the position of line 12—12 on Fig. 1.
Figure 13 is a plan view of a governor mechanism for controlling the speed of the mechanism which moves the tape.
Figure 14 is a plan view of the main drive gear and ratchet mechanism.

Referring now in detail to the drawings, Figs. 1 to 8 inclusive, I will first describe the roller actuating mechanism which operates the record making mechanism to indicate the rotation of the instrument in the hole.

A body 20, is provided at its upper end with a threaded coupling socket 21 for connection with a drill pipe 22, Fig. 15, and at its lower end with an externally threaded end 23, for connection with a case 24, which encloses the recording mechanism, hereinafter described. The body 20, adjacent the upper end is provided with four bearing cavities, all designated 25, to receive the upper ends of four channel levers, 26, having slot and pin connections 27 at their upper ends, and connected at their lower ends with four rollers, 28, 28, with any suitable anti-friction bearings at 29, 29, whereby said rollers turn easily when they are moved relative to the wall of a well with which they are in engagement. The lower end of the body is also provided with four bearing cavities, all designated 30, and in which the lower ends of channel levers 31, 31, are pivotally connected, similar to the levers 26, 26, and the upper ends of which levers are connected to the lower ends of the rollers 28, 28, with a pivotal connection, designated 31', Fig. 8. The lower ends of the rollers 28, are extended by means of spindle portions 28', 28', and by means of a universal connection 32, each is connected with a shaft 33, in the channel lever 31, each shaft having a sleeve and joint at 34, with telescoping connection to the lower end 33' of the shaft. The lower end of the shaft section 33' in each case is connected by means of a universal joint 35, with a shaft 36, on which is a pinion 37, in the lower end or foot of the body, as clearly seen in Fig. 2, in mesh with a gear 38, on a shaft 39, which projects down into the threaded coupling end 23, of the body, for a purpose again referred to. Thus all four of the rollers 28, 28, are rotatably supported at their opposite ends, and at their lower ends are connected through the shafts 33, 33, and the short shafts 36, 36, and pinions 37, 37, with the gear 38, and a driving shaft 39. The rollers 28, 28, are fluted so that when they are moved relative to the wall of the well they will be turned, and when any one or more of said rollers are turned, it operates to turn the gear 38 and the drive shaft 39.

The middle portion of the body of this mechanism comprises four long bars or boltlike members, designated 20', 20', with their opposite ends anchored in the upper end or head, and the lower end, or foot, with heavy nuts 20ª, 20ª, securing them rigidly together. The inner faces of said members 20', 20', are faced, as seen in Figs. 4 and 5, to give clearance for the collapsing of the levers 26, 26, and 31, 31, when the four rollers 28, 28, are all forced inwardly to the center, as hereinafter again referred to. Each of the levers 26, 26, has connected therewith, intermediate its ends, a lever 40, the lower end of which, in each case, is pivotally connected with a slide member 41, sliding in a guide 42, at its upper end, which guide is secured to the four bolt members 20', 20', and through a guide 43, secured to said bolt members 20', 20', as seen in Fig. 5. The slide member 41, is cut away at its four sides to receive the four levers 40, 40, which are beveled on their inner edges, as clearly seen in Fig. 4, this portion of the slide member being designated 41'. Below the lower ends of the levers 40, 40, said slide member is reduced to a round shank portion 41ª, through the guide 43. Below said guide 43, said round shank portion 41ª of the slide member 41 is provided with nuts 44, 44, and a coiled spring 45, the lower end of which bears upon a bearing block 46, secured to the four bolts or bars 20', 20', forming a part of the main body structure, designated as a whole 20. Thus when the four rollers 28, 28, are compressed inwardly, the short levers 40, 40, move together, with their beveled inner edges assuming the positions indicated in Fig. 4, the slide member 41, 41', 41ª, is forced downwardly against the tension of the coiled spring 45, as will be clear from Fig. 2. The lower portion of the structure, including the channel levers 31, 31, and similar short levers 40ª, 40ª, connected with a similar slide member, designated 47, 47' and 47ª, operate on a coiled spring similar to spring 45, but not shown on account of lack of room, but which will be understood as being a duplicate of the upper portion of said structure.

I will now describe the recording instrument which is attached to and operated from the mechanism shown in Figs. 1 and 2. This recording mechanism is enclosed in the case 24, which is coupled to the lower end of the member 23, Figs. 1 and 2. The drive shaft 39, within said member 23, has a clutch member 50, having a slot and pin connection with the shaft 39, with a coiled spring for normally holding it down, said spring being designated 50'.

The instrument mechanism is mounted within a housing, designated 51, shown with its cover removed in Figs. 9 and 10, Fig. 10 showing the housing and the mechanism removed from the outer case 24. In the sectional view, Fig. 12, the cover, designated 51' is indicated in place and is a semi-circular plate which is placed over the mechanism before said housing is inserted into the outer case 24.

The upper end of said housing 51 is a cap 52, telescoping into the upper end of said housing and secured thereto by means of little screws 53. The bottom of this cap 52, is designated 54, and is provided with two concentric slots 55 and 56, one within the other, as indicated in Fig. 11, an enlarged sectional view, with their ends in overlapping positions, said concentric slots 55 and 56 being continued from their ends in the form of cams, as 55' and 56', so that each slot with its spaced cams forms a complete circle, one within the other, as will be clear from Figs. 9 and 11.

Revolubly mounted through said cap structure 52, is a shaft 57, provided at its upper end with a clutch or coupling member 58, with a projecting through pin 59 securing it to said shaft 57, said coupling member 58 being adapted to interlock with the member 50, on the lower end of the drive shaft 39, when moved together axially. The lower end of the shaft 57 has a bearing in the center of the bottom 54, as clearly seen in Fig. 9. Secured to said shaft 57 within said cap 52 is an arm 60, having two pencils 61 and 62, telescopically mounted therein, each provided with a collar, as 61' and 62', adapted to ride the cams while revolving with said shaft 57, or to descend to allow the pencils to protrude through the slots 55 and 56, as the case may be. Said pencils 61 and 62 are spring pressed downwardly, as clearly illustrated, by springs designated 61$^a$ and 62$^a$. Thus it will be seen that as said shaft 39, and the shaft 57 are revolved, one pencil will be down in marking contact with a tape 63, moving across a supporting table 64, in the upper end of the housing 51, said pencil being at one side of its axis of rotation, while the other pencil will be up, riding the cam, as seen in Fig. 9, said other pencil, when down, will be at the opposite side of the shaft 57, and these pencils can be of different colors so as to differentiate the marks made thereby, and as hereinafter again referred to.

Mounted in the upper end of the housing 51, under the table 64, upon supporting brackets 65, is a spool 66, from which the tape 63 moves, under a leaf spring 67, which keeps it yieldingly taut. Said tape 63 moves down and under a guide roller 68, across and over another guide roller 69, and then it is turned to pass under another roller 70, set at right angles to the first rollers 68 and 69, and is continued downwardly and back of a roller 71, from which it passes down to and around a roller 72, and thence upwardly and around a receiving spool 74, having its shaft 75 movably mounted in vertical slots or guideways 76, 76, the roller 72 being a drive roller and provided with a sprocket 77. The receiving roller or spool 74 rests by gravity upon the driving roller 72, and is driven by frictional contact therewith, at the same time receiving the accumulating tape and keeping it wound closely by reason of the weight of the spool upon the friction driving roller 72. The tape passes around said driving roller 72, thus giving it sufficient grip upon the tape to pull it from the supply roller or spool 66 above. The tape 63, after it passes through the table 64, above the supply spool 66, passes down over the vertical face of a vertical table or block 78, and then again, after it leaves roller 70, it passes down over the vertical face of a second table or block 79, and thence to the driving roller 72.

Pivotally suspended immediately under the supply spool 66, and opposite the table or block 78, is a combination pendulum weight 80, having in its side next to said table or block 78, a spring-pressed pencil 81, as clearly seen in Fig. 9, said pendulum weight swinging on an axis transverse to the axis of the spool 66, so that as said pendulum weight swings, the pencil will mark upon the tape 63, as indicated in Fig. 10, at 82.

A second pendulum weight 83, is pivotally mounted at 84, to swing upon an axis at right angles to the axis of the first pendulum weight. A similar spring-pressed pencil 85, is mounted in its face adjacent the tape and block 79, so that said pencil bears upon and marks any swinging movement thereof upon said tape 63. The pencils are inserted in said pendulum weights from the opposite side, which is provided with a screw plug 86, with spring 87. These two pendulum weights, 80 and 83, swing at right angles to each other, and mark upon the opposite sides of the tape 63, the extent of movement of each device, which indicates the tilt of the case in which the pendulum weights are suspended.

The drive for the tape is from a spring motor in the bottom of the housing, and is designated 88, and includes a main spring 89, attached at one end to a shaft 90, and its other end is attached to the side of the housing, as at 91. The shaft 90 is provided with a key-receiving end 90', accessible through a screw-plug closed opening 92 in the outer case. The upper end of said shaft 90 is provided with a ratchet wheel, 93, seated in the top of a beveled gear 94, with a spring pressed pawl 95, on the gear to engage the ratchet wheel 93, secured to the shaft 90, as will be understood from Fig. 14, taken with Fig. 9. The beveled gear 94 meshes with a beveled pinion 96, on a shaft 97, provided with a gear 98 at its opposite end, and this gear drives a pinion 99, on a drive shaft 100, having a sprocket 101 at its other end, with a sprocket chain 102 running up to the sprocket wheel 77, which drives the friction or drive roller 72, before referred to and which moves the tape on to the receiving spool 74.

The control of the drive is through a chain of gears and pinions, clearly shown, and including gears and pinions, designated, respectively, 103, 104, 105, 106, 107, 108, 109, to 110, a pinion in a governor 111, shown in Fig. 13, and consisting of a spindle 112, on which the pinion 110 is mounted, and on which is also mounted a carrier member or plate 113, to the ends of which are pivotally connected two brake shoe members, 114, 114, with springs, as 115, attached thereto and to the ends of a plate 113', said brake shoes revolving within a cup-like member 116. The top plate 113' is adjustable relative to the carrier plate or member 113 by means of a slot and screw connection at 117, whereby the top plate 113' and the carrier plate 113 thereunder can be slightly adjusted relative to each other to regulate the tension of the springs 115, 115. This governor 111 automatically controls the speed of the driving mechanism from the motor and insures a uniform speed for moving the tape and will run for hours.

In the upper end of the housing, above the cap 52, the projecting pin 59 is used to position the initial setting or start of the recording mechanism, and the outer case 24 is provided with a screw closure 24ª for viewing the position of the pin 59 in adjusting the mechanism to start down into a well, as hereinafter again referred to.

In Fig. 15, the entire instrument is shown connected with the regular drill pipe 22, and by means of which it would be let down into a well being surveyed. It will be understood, of course, that these long strings of drill pipe do turn and twist as they descend into the well, and it is this turning or twisting which causes the instrument rollers 28, 28, to be turned for operating the instrument in the case 24. Said rollers are all geared together so that the turning of one turns all four of them.

In Fig. 16, I have shown how the instrument can be connected to a cable C and a sinker bar 119, and let down into a well which it is desired to survey. It is to be understood that the ratio of the rollers 28, 28, and the gears connecting them together and to the instrument driving shaft 39, to the size of the drill hole is such that the pencil arm 60 and its marking pencils 61 and 62 are maintained in a given position although the case 24 and the rollers 28, 28 rotate or turn as they move down into the well.

In Fig. 17, assuming that the pencil carrying arm 60 is to the north and the outer pencil 61 is making the mark on the tape 63 as said tape is moved through the instrument, it continues in a straight line to the second position "north" and then the instrument and tape commence to turn to the northeast and then to the east, as indicated by the margin, the arm 60 is maintained in its north position, but the tape is turned with the instrument, thus the mark is deflected off to the right of the tape as seen in Fig. 17, until the instrument and arm is turned to the "east", whereupon the opposite pencil is let down into marking position and the first pencil is raised. As the instrument continues to turn, the second pencil, marking another color, preferably, and indicated by heavy broken line. Thus as the instrument turns or revolves in the well, the pencils are operated to indicate the rotation upon the tape which turns with the instrument, as well as being fed lengthwise from one spool to the other.

The combination pendulum weights 80 and 83, according to tilt of the case 24 and which causes the rotation of the entire instrument, mark the opposite sides of the tape, as indicated by the marks 120 and 121, the reverse side of the tape being the lower section of Fig. 17.

While I have shown and described my invention in form for surveying wells, I am aware that features thereof are usable for other purposes and that many changes can be made in the details of construction and arrangement without departing from the spirit of the invention, and I do not, therefore, limit the invention, except as I may be limited by a broad and fair interpretation of the hereto appended claims.

I claim:

1. In an instrument for determining the deviation of wells from the vertical a plurality of wall-engaging elements adapted to be yieldingly expanded radially to engage the wall of the well, operating connections therebetween whereby the radial movement of one of said elements moves another correspondingly, and operating connections from said wall-engaging elements for actuating a recording mechanism, whereby movement of said wall-engaging elements relative to said wall moves said recording mechanism.

2. In an instrument for determining the deviation of wells from the vertical, a plurality of rotatable wall-engaging elements adapted to be yieldingly expanded radially to engage the wall of a well, operating connections therebetween whereby radial movement of one of said elements moves another correspondingly, recording mechanism, and operating connections from said wall-engaging elements to said recording mechanism, whereby any rotative movement of a wall-engaging element operates to change the directional position of said recording mechanism and indicates on said tape such movement.

3. In an instrument for surveying a well, a plurality of rotatable elongated rollers with roughened surfaces forming wall-engaging elements, means yieldingly connecting said elements for radial expansion and contraction to hold them in engagement with the wall of a well, means operatively connecting said elements to rotate together, a recording mechanism including a record-receiving member, means for connecting said wall-engaging elements for operating said recording mechanism.

4. In an instrument for surveying a well, a plurality of rotatable rollers, wall-engaging elements, means yieldingly connecting said rollers at their opposite ends for radial expansion and contraction to hold them in sidewise engagement with the wall of a well, means operatively connecting said elements to rotate together, a recording mechanism including a record-receiving tape to receive the record from said recording mechanism, and means for connecting said wall-engaging elements to operate said recording mechanism.

5. In a well surveying instrument, a plurality of wall engaging rollers, a central body around which said rollers are mounted in parallel relationship, collapsible supports for the opposite ends of said rollers adapted to move them inwardly together around said central body with spring means for moving them outwardly, drive shafts from said rollers operatively connected for simultaneous operation, and a driven member for operating a recording mechanism, said driven member being operated by said drive shafts from said rollers.

Signed at Los Angeles, Los Angeles County, California, this 10th day of Sept., 1930.

WILLIAM J. WILLIAMS.